United States Patent [19]
Straub et al.

[11] Patent Number: 5,905,492
[45] Date of Patent: *May 18, 1999

[54] DYNAMICALLY UPDATING THEMES FOR AN OPERATING SYSTEM SHELL

[75] Inventors: Eric John Straub, Kirkland; Steven Alfred Isaac, Bellevue; Eric George Jakstadt, Bothell; Teresa Martineau, Kirkland, all of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/761,567

[22] Filed: Dec. 6, 1996

[51] Int. Cl.⁶ .................................................... G06F 7/00
[52] U.S. Cl. ......................... 345/333; 345/356; 345/335
[58] Field of Search ................................... 345/329, 333, 345/334, 335, 337, 356, 357, 762, 774, 806, 807, 339, 327

[56] References Cited

U.S. PATENT DOCUMENTS

| | | | |
|---|---|---|---|
| 4,575,579 | 3/1986 | Simon et al. | 324/427 |
| 5,305,195 | 4/1994 | Murphy | 361/704 |
| 5,347,632 | 9/1994 | Filepp et al. | 395/200.02 |
| 5,491,820 | 2/1996 | Belove et al. | 395/603 |
| 5,530,852 | 6/1996 | Meske, Jr. et al. | 345/762 |
| 5,572,643 | 11/1996 | Judson | 345/762 |
| 5,654,886 | 8/1997 | Zereski, Jr. et al. | 345/807 |
| 5,659,729 | 8/1997 | Nielsen | 345/762 |

FOREIGN PATENT DOCUMENTS

| | | | |
|---|---|---|---|
| 0749081A1 | 5/1996 | European Pat. Off. | G06F 17/60 |
| WO 96/30864 | 10/1996 | WIPO | G06K 13/00 |

*Primary Examiner*—Raymond J. Bayerl
*Assistant Examiner*—Cao H. Nguyen
*Attorney, Agent, or Firm*—Klarquist Sparkman Campbell Leigh & Whinston, LLP

[57] ABSTRACT

A theme provides a group of multi-media resources for enhancing displays in a graphical user interface to an operating system of a computer according to a topic of the theme. The theme's resources are periodically updated by retrieving updating resources from a remote computer at which the updating resources are stored by a theme provider, so as to provide continually updating enhancements to the graphical user interface display consistent with the theme's topic. The theme's resources can include hypertext templates which define the graphical user interface displays as hypertext pages, allowing the theme to provide a wide variety of enhancements to the displays including text, graphics, hyperlinks, and software components, among others. The theme also enhances a graphical user interface with a view port that plays live or locally cached information from the Internet in each of a plurality of categories, by adding a category for the theme so as to play information from the theme's provider in the view port.

18 Claims, 6 Drawing Sheets

DYNAMICALLY UPDATING THEMES FOR AN OPERATING SYSTEM SHELL

FIELD OF THE INVENTION

This invention relates to customization of and integration of multimedia resources into a graphical user interface of an operating system of a computer, and more particularly relates to integration of themed multimedia resources into the graphical user interface.

BACKGROUND AND SUMMARY OF THE INVENTION

It is now common for operating systems to have a shell which provides a graphical user interface (GUI). The shell is a piece of software (either a separate program or component part of the operating system) that provides direct communication between the user and the operating system. The graphical user interface typically provides a graphical icon-oriented and/or menu driven environment for the user to interact with the operating system.

The graphical user interface of many operating system shells is based on a desktop metaphor. More specifically, the graphical user interface is intended to create a graphical environment which simulates working at a desk. These graphical user interfaces typically employ a windowing environment with a desktop.

The windowing environment presents the user with specially delineated areas of the screen called windows, each of which is dedicated to a particular application program, file or document. Each window can act independently, as if it were a virtual display device under control of its particular application program. Windows can typically be resized, moved around the display, and stacked so as to overlay another. In some windowing environments, windows can be minimized to an icon or increased to a full-screen display. Usually, the windows have a top to bottom order in which they are displayed, with top windows at a particular location on the screen overlaying any other window at that same location according to a z-order (an order of the windows along a conceptual z-axis normal to the desktop or display screen). The top-most window has the "focus" and accepts the user's input. The user can switch other windows to the top (and thereby change the z-order) by clicking on the window with a mouse or other pointer device, or by inputting certain key combinations (e.g., the "alt+esc" or "alt+tab" keystrokes on a Microsoft Windows-equipped computer). This allows the user to work with multiple application programs, files and documents in a similar manner as physically working with multiple paper documents and items which can be arbitrarily stacked or arranged on an actual desk.

The desktop of the graphical user interface is a screen display containing icons representing programs, files and resources available to the user. As such, the desktop acts as a launching point for running application programs, opening documents or files, and initiating operating system services. In accordance with the desktop metaphor, the desktop simulates the top of an actual desk on which various work items are made available to the office worker. The desktop in some graphical user interfaces thus includes icons representing work resources found on a real desk, such as a file cabinet, telephone, wastebasket, and scratchpad. The icons can be activated by the user to launch application programs that act as computer equivalents of the actual work resource. In typical graphical user interfaces, the desktop always remains as a full-screen background display relative to the windowing environment. In other words, the desktop cannot be moved or resized, and all visible windows of the windowing environment overlay the desktop as would paper documents, files, and other items on top of an actual desk. The desktop thus effectively provides a graphical work surface underlying the windowing environment.

One example of a graphical user interface having a desktop and a windowing environment is that provided by the shell of the Microsoft Windows 95 operating system. As a default, the desktop in this graphical user interface includes a "my computer" icon, a "network neighborhood" icon, and a "recycle bin" icon against a solid color background, and also includes a task bar along a bottom edge of the screen with a "start" button for menu-driven interaction. Application programs are launched from the desktop by clicking on an icon or selecting from a menu, and presented in a re-sizeable and moveable window among other application windows overlaying the desktop in a z-order.

The Windows 95 graphical user interface provides many opportunities to enhance or customize its appearance and operation according to a user's preferences. For example, it is possible to add additional icons onto the desktop to represent other application programs, documents, files, and resources. The start menu also can be customized to include additional items, such as for launching particular applications, and opening documents or files. A graphic image can be selected as a background of the desktop (called "wallpaper") in place of the default solid color background. Sounds can be associated with various activities such as mouse operations (e.g., single click and double click activations), and window operations (e.g., opening and closing an application window). The mouse pointer and other icons can be animated.

In addition to these numerous individual customizations, the Windows 95 graphical user interface also can be customized with themed enhancements. More specifically, Microsoft distributes an add-on product for the Microsoft Windows 95 operating system, called the Microsoft Windows 95 Plus Pack, which includes packaged groups of theme-related multi-media enhancements (called "themes") for the Windows 95 graphical user interface. Each theme includes a group of resources which alter the appearance and feel of the Windows 95 graphical user interface. These resources include substitute icons, mouse pointer graphics and animations, sounds, a wallpaper, and a screen saver which all relate to a title of the theme. The plus pack, for example, includes themes entitled, "Nature," "Leonardo Da Vinci," "Mystery," "Science," and "Sports," among others.

A particular theme is selected and applied by the user to the graphical user interface using a themes applet which the plus pack installs into the Windows 95 control panel (an application program group which includes small application programs or applets that control various aspects of the operating system). The themes applet provides a dialog window which presents a list of available themes and has controls which a user can activate to select a theme, preview a selected theme and apply the selected theme to the graphical user interface. When applied to the graphical user interface, the applied theme changes the desktop's wallpaper, the graphics of the "my computer," "network neighborhood" and "recycle bin" icons, the screen saver, the graphic and animation of the mouse pointer and other user interface elements using the resources packaged within the theme. As a result, the Windows 95 graphical user interface has an appearance and feel which is consistent with the theme's title or topic. When the Leonardo Da Vinci theme is applied to the Windows 95 graphical user interface for example, the theme changes the wallpaper to a graphic which includes the artist's drawings, changes the mouse pointer to an animated paint brush and palette, and changes other elements to like enhancements related to and consistent with a Leonardo Da Vinci motif.

A limitation of these Windows 95 themes is that they package a static set of enhancements to the graphical user interface. Once a theme is applied to the graphical user interface, the enhancements added by the theme to the graphical user interface remain the same. More specifically, the wallpaper, the icons, the mouse pointer graphic and animations, the screen saver and other enhancements added by the theme to the graphical user interface remain unchanged, at least until the user chooses to apply a new individual customization or another theme. As a result, the theme only provides a novel appearance to the graphical user interface when it is first applied, and consequently often is not a source of continuing interest to the user.

Another limitation to Windows 95 themes is that they have little capacity to convey related factual information. The themes can provide only specific types of enhancements which suggest the topic of the themes, such as wallpaper, icons, animations, screen savers, and the like, but do not convey much factual information. The Leonardo Da Vinci theme, for example, adds many multi-media enhancements to the graphical user interface which suggest associations with Leonardo Da Vinci, such as the artist's drawings depicted in that theme's wallpaper and the animated mouse pointer depicting a paint brush and artist palette. However, the enhancements provided by the Leonardo Da Vinci theme are not able to convey much factual information about the man or his achievements. Also, since the theme's resources are static and committed at the time the resources are packaged into the theme, any information conveyed may lose timeliness. Thus, this static nature of the theme's resources is not conducive to conveying time sensitive information about the theme's topic.

The present invention embodies methods and apparatus to provide themed multi-media enhancements to the graphical user interface of a computer's operating system which overcomes these and other limitations of the prior art. According to a first aspect, the invention provides themed enhancements to the graphical user interface of a computer (the "theme-enhanced computer") which are repeatedly updated. In a preferred embodiment of the invention, an update service performs recurring updates to the themed enhancements by downloading updating resources from a server computer on a network, such as the Internet, connected to the theme-enhanced computer. The update service automatically performs the updating at scheduled intervals, at times that the user is otherwise connected to the network, or on other bases. A provider of the themed enhancements may continually change the updating resources residing on the server so as to make new enhancements which are consistent with the theme continually available to the theme-enhanced computer. For example, enhancements based on a Leonardo Da Vinci theme can provide wallpaper which one week is an image from Da Vinci's engineering drawings, and a next week is updated to one of Da Vinci's art images. Because the themed enhancements are recurringly updated, the themed enhancements are more likely to retain the user's interest, as well as the timeliness of their information content.

According to another aspect of the invention, the themed enhancements are applied to an operating system graphical user interface in which various displays in the graphical user interface, such as the desktop and views of file system folders, are generated as hypertext pages. The themed enhancements can include templates and style sheets used in generating the hypertext pages of the graphical user interface. With the templates, the themed enhancements can add text, hyperlinks, images, and other multimedia resources consistent with the theme that can better convey factual information relating to the theme's topic. For example, the text of a hypertext page used for a display in the graphical user interface can state factual information relating to the theme, while hypertext links on the page provide access to additional supplemental pages of information on the theme. The style sheets can better control formatting of multi-media resources in a display.

According to yet another aspect of the invention, the themed enhancements add a theme channel to a graphical user interface which includes a display pane or window for playing multi-media resources retrieved from servers on a computer network, such as from sites on the Internet. The graphical user interface may, for example, play the multi-media resources in a scrolling ticker display, a sequential or slide show style display, or other display. The theme channel is associated with a theme provider server on the computer network. When the theme channel is selected, the graphical user interface retrieves and plays multi-media resources from the theme provider server. The themed enhancements are thus able to enhance the graphical user interface of a computer with theme-consistent, dynamically playing multi-media resources which, in effect, constitutes a new form of broadcast media.

According to a further aspect of the invention, the themed enhancements add access to supplemental multi-media resources to the graphical user interface. In one embodiment of the invention, a drop down list control is added to a display in the graphical user interface, such as a view of a file system folder, for providing access to the supplemental multi-media resources.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

1. Computer Overview

Figure 1:
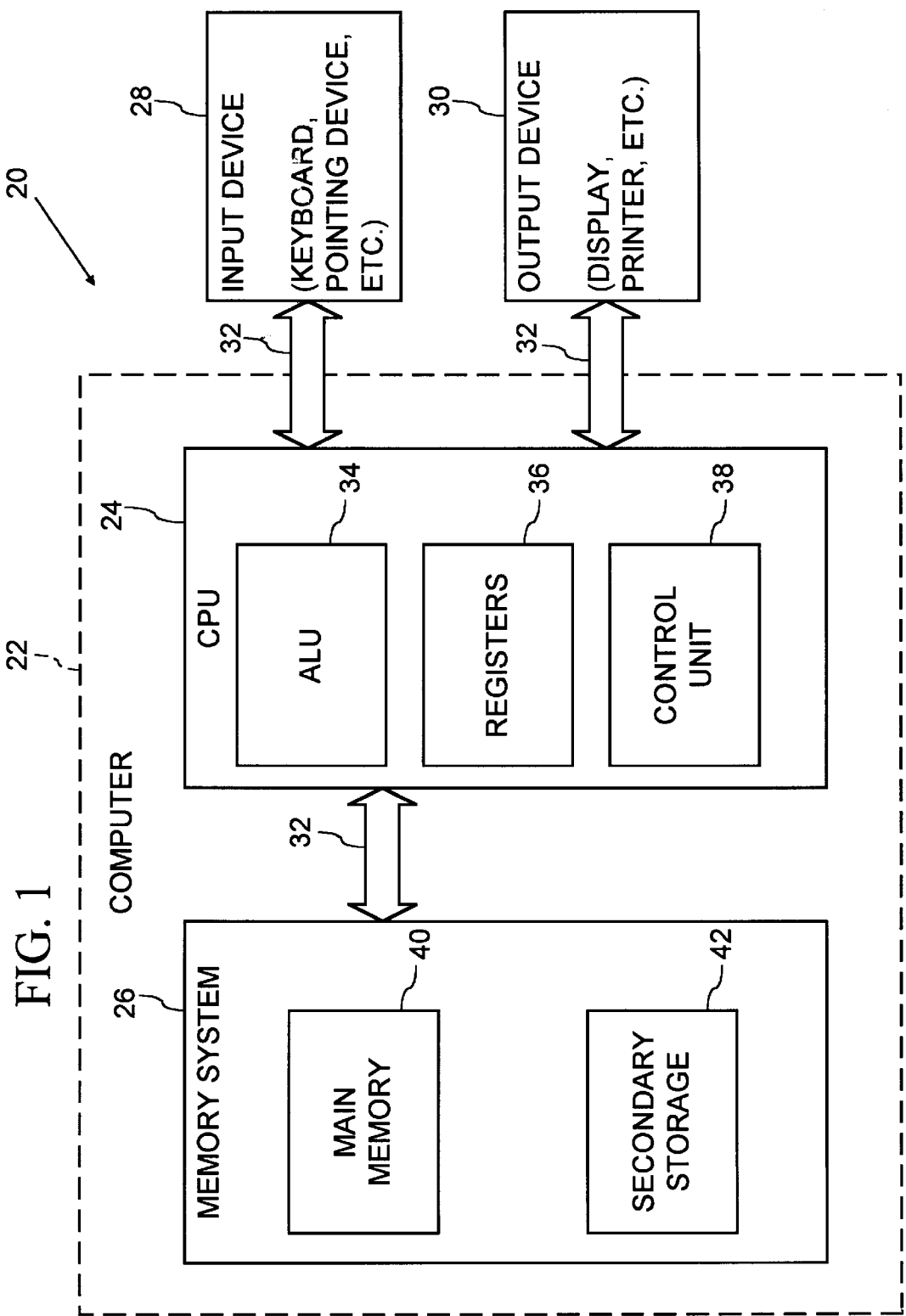
FIG. 1 is a block diagram of a computer system that may be used to implement a method and apparatus embodying the invention for providing dynamic themed enhancements to a graphical user interface.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

2. Periodically Updating Themes

Figure 2:
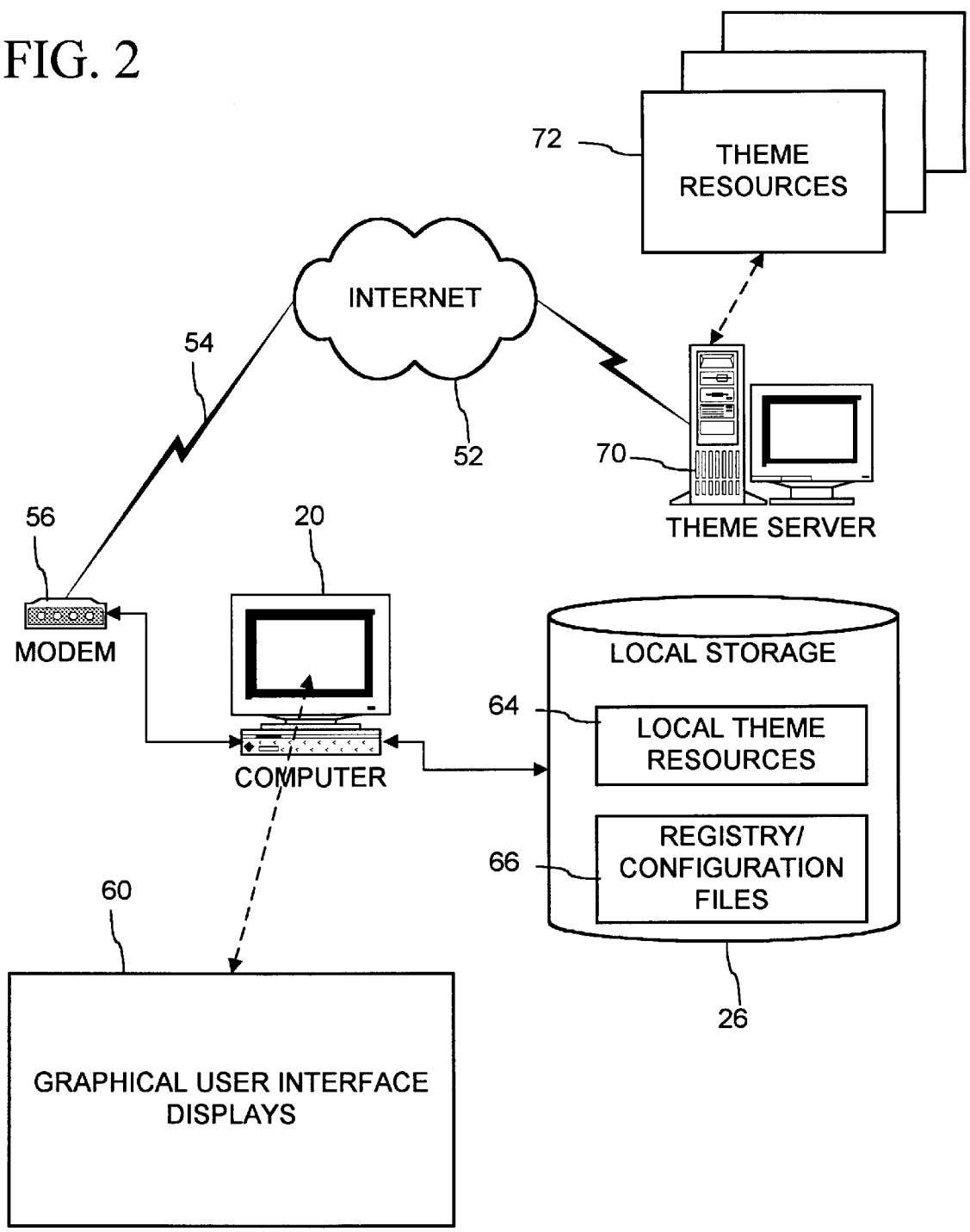
FIG. 2 is a network diagram showing the updating of themed enhancements to a graphical user interface of the computer of FIG. 1 from a remote server computer.

In an illustrated embodiment of the invention shown in FIG. 2, the computer 20 (also shown in FIG. 1) connects to a remote computer network 52. The illustrated remote computer network 52 is the Internet. (The Internet is a global network of cooperatively interconnected computer networks, consisting of millions of individual computers.) In the illustrated embodiment, the computer 20 connects to the computer network 52 over a telephone line 54 with a modem 56. Other physical connections to the computer network alternatively can be used, such as an ISDN, T1 or like high speed telephone line and modem, a television cable and modem, a satellite link, an optical fiber link, an Ethernet or other local area network technology wire and adapter card, radio or optical transmission devices, etc. The computer network alternatively can be other public or private computer networks, such as a computer network of a commercial on-line service, an internal corporate local area network (LAN), an intranet, or like computer network.

The computer 20 runs an operating system with a shell 58 (shown in FIG. 3) that provides displays 60 of a graphical user interface. In the illustrated embodiment, the operating system has a shell which provides displays similar to those of the Microsoft Windows 95 or Microsoft Windows(D NT 4.0 operating system. This graphical user interface has a desktop and a windowing environment. The desktop includes graphical icons (e.g., "My Computer," "Network Neighborhood," and "Recycle Bin" icons) and menus (e.g., a "Start" menu accessed via a start button, and context sensitive pop-up menus activated by right clicking on an object), and is presented in the windowing environment as a background graphical work surface underlying any open windows.

The computer 20 locally stores one or more groups of multi-media resources (herein referred to as "themes") 64 in its memory system 26 (FIG. 1). The resources in the illustrated themes include still images, video, sounds, animations, text, and the like stored as a file or files. The multimedia resources in each theme 64 are all conceptually related to a topic or title of the theme. Theme topics can include general interest categories, such as Sports, Mystery Novels, Dinosaurs and the like. Theme topics also can include subjects related to a particular business or commercial activity, such as a particular corporation, a particular product or service, and the like.

Themes also can be created for a specific user's interest, such as a favorite pet and the like.

The resources of each theme 64 enhance the graphical user interface 60 of the computer's operating system by altering various sensory elements of the interface, such as the wallpaper, the mouse pointer, the icons, and the sounds presented in the interface. Although multiple themes can be locally stored in the computer 20, generally only one theme can be selected at a time to enhance the graphical user interface 60. Alternatively, the user may select components from multiple themes to enhance the graphical user interfaces, such as a color scheme from one theme and mouse event sounds from another. The resources of a particular theme are applied to the graphical user interface by setting identifying information into a system registry or configuration files 66. In the Microsoft Windows operating system, the system registry is a database which stores configuration information for the operating system, including information to enumerate and track applications, device drivers, and operating system control parameters.

For a detailed discussion of the registry, see *Win32 Programmers Reference,* Vol. 2, published by Microsoft Press, Redmond, Washington (1993). The theme identifying and configuring information can be additionally or alternatively stored in configuration files (such as an ".ini" file) or other storage locations in the memory system 26. When the operating system shell generates the displays in the graphical user interface, the shell checks the configuration information set in the system registry and/or other configuration files for the resources to include in the graphical user interface 60.

In accordance with the invention, the resources of at least the currently selected theme are periodically updated from a theme server 70 on the computer network 52. The theme server 70 is a server computer on the network 52 which is managed by a theme provider, and stores a group of resources 72 for one or more themes supplied by the theme provider. The theme provider is an individual or organization which provides the periodically updating theme as a service to the user of the computer 20, and can be another computer user, a system administrator, a software developer (e.g., an independent software vendor or "ISV"), among others. The theme resources 72 are changed by a theme provider at intervals, such as monthly, weekly, or more or less frequently, so as to supply new resources for updating the theme.

Software at the computer 20 automatically downloads new theme resources 72 from the theme server 70 to update the locally stored resources 64 of the theme. The newly downloaded resources can replace the theme's resources which were previously stored locally at the computer 20, or add to the previous resources. The newly downloaded resources are then used in generating the displays of the graphical user interface 60. As a result, the theme provides continually and actively changing enhancements to the graphical user interface 60.

In the illustrated embodiment, the theme resources 72 supplied by the theme provider from the theme server constitute components of the theme, such as a background wallpaper file or a hypertext page for a folder view (described below), which are applied individually as replacement or supplemental theme components (as opposed to a package of resources which replace the theme as a whole) so as to dynamically modify the theme a ppart at a time over time.

3. Theme Software

Figure 3:
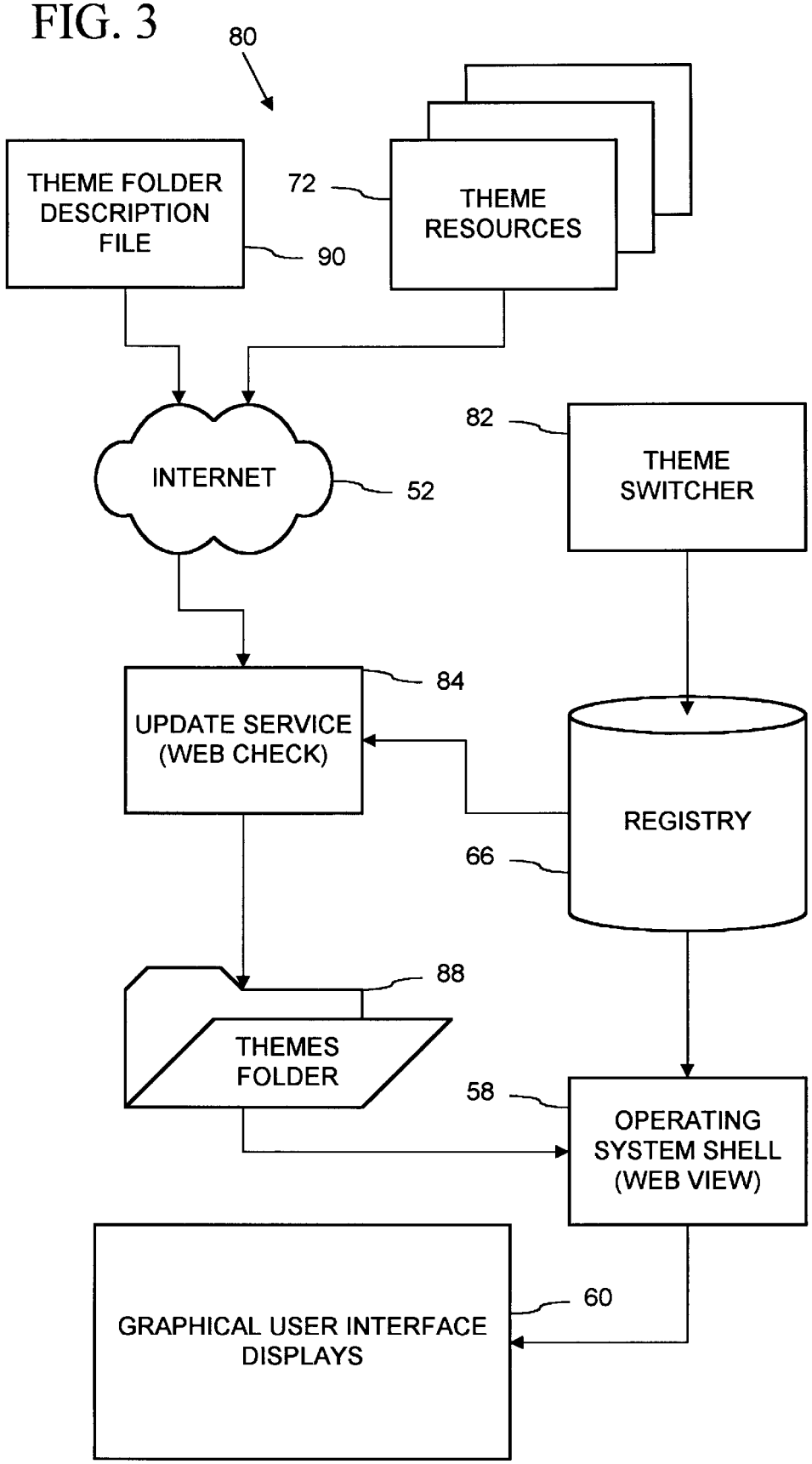
FIG. 3 is a data flow diagram of software components in the computer of FIG. 1 for updating the themed enhancements to the graphical user interface of the computer.

FIG. 3 illustrates the data flow for a periodically updating theme within a software architecture 80 of the computer 20 (FIGS. 1 and 2). The software architecture 80 includes a theme switcher 82 and an update service 84. The theme switcher 82 provides a user interface in which the user of the computer 20 can select a desired one of the themes installed at the computer 20 for enhancing the graphical user interface displays 60. The illustrated theme switcher 82 is a small application program (referred to as an "applet") which, when installed at the computer 20, is included by default in a program group referred to as the "control panel." The control panel in the Microsoft Windows operating system includes a number of applets with which the user can modify various settings that control the operating system, and device driver software. The theme switcher is launched by clicking an icon representing the theme switcher in a graphical icon display of the control panel program group, or by selecting a menu command for the theme switcher in a menu of the control panel program group.

When the theme switcher 82 is open, the theme switcher provides a user interface in the form of a window or dialog box. This theme switcher user interface includes a list box which enumerates the themes currently installed at the computer 20 (FIG. 2), and buttons for the user to select a desired one of the themes. When the user selects a theme, the theme switcher modifies settings in the registry and/or configuration files 66 to indicate the resources of the theme to be used by the operating system shell 58 in presenting the graphical user interface displays 60.

In the illustrated software architecture 80, the locally stored resources 64 (FIG. 2) of each theme that is installed at the computer 20 (FIG. 2) are stored in separate theme folders 88 of the file system. The illustrated theme folder 88 is stored in the file system under the directory path name, "<root drive>:\Program Files\Plus!\Active Themes\<theme name>," where "<theme name>" is the name of the installed theme and "<root drive>" is a letter designating a selected logical data storage drive (typically a hard drive) on the computer.

The illustrated update service 84 is a software module herein referred to as "Web Check" which is described in a co-pending U.S. patent application, entitled "Object Framework And Services For Periodically Recurring Operations," filed concurrently herewith (a copy of which is attached) (referred to hereafter as the "Web Check patent application"). The Web Check update service 84 includes a feature referred to herein as "smart folders." A smart folder is a folder in the computer's local storage whose contents are specified by a file (called a folder description file or web collection file ("WCF")) residing on a remote server computer. The smart folder has associated with it a uniform resource locator (URL) that designates the WCF. (URLs are well known identifiers used to designate files and other resources on the Internet. URLs typically define a Internet transport protocol, a domain name of a server computer, a port address, and a directory path to the resource.) In the illustrated software architecture 80, the theme folder 88 is a smart folder whose associated URL designates an WCF 90 residing on the theme server 70 (FIG. 2).

The illustrated WCF 90 can contain any of three main sections, which are as follows:

1.

Files To Download. This section contains a list of files that the Web Check update service 84 (FIG. 3) is to download from the remote theme server 70 (FIG. 2), and locally store in the theme folder 88 (FIG. 3) at the computer 20 (FIG. 2). The files are listed in statements having in the form of "<local path name>=<URL>." The local path name is a file system path name relative to the theme folder which designates a location in the theme folder 88 or in any of the theme folder's sub-folders. The URL designates the file at the theme server 70 (or other server accessible on the computer network 52 from the computer 20) which is to be downloaded and stored at the designated local storage location.

2.

URLs To Create. This section contains a list of URLs that the Web Check update service 84 is to store as Internet Shortcuts (described below) in the theme folder 88 or sub-folder thereof. The URLs are listed as statements which include a local path name, an '=' character, a URL, and a comma delimited list of Internet Shortcut properties. As with the Files to Download section, the local path name designates a location to store the Internet Shortcut in the theme folder 88 or its sub-folders, whereas the URL is the URL to be stored as the Internet Shortcut at that location.

3.

Cache Only. This section contains a list of URLs which designate files that the Web Check update service 84 is to download and store in a cache. The cache in the illustrated software architecture 80 is an Internet cache used for temporary storage of data downloaded from the Internet while browsing the data using an Internet browser software (such as the Microsoft Internet Explorer). If the URL designates a file in hypertext mark-up language (HTML) format, the Web Check update service 84 parses the HTML file and also caches any other files (referred to herein as "dependencies" of the HTML file) which are referenced in the HTML file for incorporation into a hypertext page defined by the HTML file.

Hypertext pages in the HTML format are ASCII encoded files which employ tags to designate text formatting, hyperlinks, and multi-media resources (the file's "dependencies") to be incorporated from other resources (e.g., files) into the document. The Web Check update service 84 also creates entries in an URL section of the registry 66 to track the cached files designated in the Cache Only section of the WCF.

The following is a listing of a sample folder description file.

```
[Files to download]
wallpaper.gif =
http://www.themeprovider.com/theme/images/wallpaper.gif
mycomp.ico = http://www.themeprovider.com/theme/icons/mycomp.ico
/Sports/folder.htx = http://www.themeprovider.com/template/folder.htx
[URLs to Create]
"University of Waterloo" = www.waterloo,ca, cache = "sticky", author =
"Teri Martin", category = "education"
"ESPNet" = www.espnet.com, cache = "sticky", author =
"StarwaveCorp", category = "Sports"
News/"Globe and Mail" = www.Globemail.ca, cache = "", author =
"Editor's at the Globe", category = "news"
[Cache Only]
http://www.foo.com/microsoft/startpage.htm
http://www.foo.com/espn/sportszone.htm
```

The theme WCF 90 associated with the theme folder 88 is specified by an entry in the registry 66 for the Web Check update service 84. This Web check registry entry has the following form:

```
\HKCU\Software\Microsoft\Windows\CurrentVersion
    \WebCheck
        \0000
            (REG_DWORD) Flags=0x00000000
            (REG_STR) Path=, "c:\Program Files\Plus!\Active
Themes\sample theme"
            (REG_STR) URL="http://www.samplethemesite.com/WCF"
```

The "flags" value of zero in this entry indicates that the folder specified by the "Path" text string is a smart folder, and that the file designated by the "URL" text string is the WCF associated with the folder.

The Web Check update service 84 updates data at the computer 20 according to Web check entries in the registry 66, including the entry for the theme folder 88. When performing updates, the service 84 iterates through all these Web Check entries in the system registry 66. For the theme Web Check entry, the Web Check update service 84 retrieves the theme WCF 90 that is associated with the theme folder 88 as specified in the registry entry. For security, the Web Check update service 84 verifies the validity of the WCF 90 using digital signatures. If valid, the Web Check update service 88 then goes through the statements in each section of the WCF 90 and updates the contents of the theme folder 88 (and its sub-folders) as specified in these statements. In particular, the Web Check update service 88 downloads the files specified by the statements in the Files to Download section of the WCF 90 to locations in the theme folder 88, creates the URLs specified by statements in the URLs to Create section, and caches data from the theme server 70 as specified by statements in the Cache Only section.

As described more particularly in the Web Check patent application, the Web Check update service can perform updates by unattended scheduled downloading, and can also perform updates by background 30 downloading while the computer 20 is otherwise connected to the Internet 52 (such as while the user is browsing on the World-Wide Web portion of the Internet) and the network connection is idle, at the user's option. In either event, the Web Check update service performs the update automatically according to the information in the Web Check registry entries, such that the locally stored theme resources 64 (FIG. 2) are periodically and automatically updated from the theme server 70 (FIG. 2) without explicit user input or other further user action to initiate the update.

4. Hypertext Page-Based Graphical User Interface

As also illustrated in FIG. 3, the periodically updated theme resources 64 (FIG. 2) in the theme folder 88 (FIG. 3) are utilized by the operating system shell 58 in generating the graphical user interface displays 60 on the computer 20. The operating system shell 58 in the illustrated software architecture 80 (FIG. 3) includes a Web View software component. The shell's Web View component displays views of hypertext pages for at least some of the graphical user interface displays 60, including a portion of each of the desktop and folder view displays. The Web View component produces these hypertext page views in the graphical user interface displays 60 from HTML format files and templates. The shell with the Web View component is described in a co-pending patent application, entitled "Operating System Shell With Hypertext Desktop," filed concurrently herewith (a copy of which is attached hereto).

In accordance with the invention, the theme resources include hypertext templates or hypertext pages which can be substituted for default templates or pages that the Web View shell component uses in producing the graphical user interface displays 60. These hypertext templates specify the graphical user interface displays using HTML format data. Through the hypertext templates, the theme can add any multi-media enhancements to the graphical user interface displays 60 that can be specified in HTML format data, including text, images, marquees, tables, sounds, video, formatting, hypertext links to other displays or hypertext pages on the Internet, and also executable software (e.g., a Java applet or an active-x control), among others. For example, a theme with the topic of "dinosaurs" can place text that explains dinosaur facts on a particular graphical user interface display by providing a hypertext template containing the text from which the Web View shell component 58 produces the display. The theme provider likewise can place dinosaur images, sounds, fonts and other formatting, video, a hypertext link to a dinosaur museum World-Wide Web site, and other multi-media resources onto the displays 60 by including HTML tags that specify those resources in the hypertext templates. Additionally, executable software components can be added to a display through the hypertext template which provides some functionality, such as animating a dinosaur image on the display as the mouse pointer is moved across the screen. The following table lists an example set of templates for standard folders on the computer 20 that can be provided by the theme to produce various of the graphical user interface displays 60.

TABLE 1

Hypertext View Templates

| Graphical User Interface Display | Template File Name |
| --- | --- |
| Briefcase | brfcase.htm |
| Control Panel | control.htm |
| Default folder | folder.htm |
| Desktop | desktop.htm |
| Favorites folder | favorite.htm |
| File-system folder | directry.htm |
| My Computer | mycomp.htm |
| Network Neighborhood | nethood.htm |
| Printers | printer.htm |
| Recycle Bin | recycle.htm |
| Start Menu and subfolders | startmnu.htm |
| Workgroups | domain.htm |
| Vendor-specific workgroups | msdomain.htm |
| Vendor-specific networks | msnet.htm |
| Vendor-specific servers | msserver.htm |
| Servers | server.htm |
| Audio CD | audiocd.htm |
| Dial-Up Networking | dialupnt.htm |
| Entire Network | fullnet.htm |
| Fonts folder | fonts.htm |
| History | history.htm |
| My Documents | mydocs.htm |
| Network Workgroup | workgrp.htm |
| Program Files folder | progfile.htm |
| Root of data CD | datacd.htm |
| Root of floppy disk drive | floppy.htm |
| Root of hard disk | harddrv.htm |
| Windows folder | windows.htm |

5. Active Desktop Theme Channel

Figure 4:
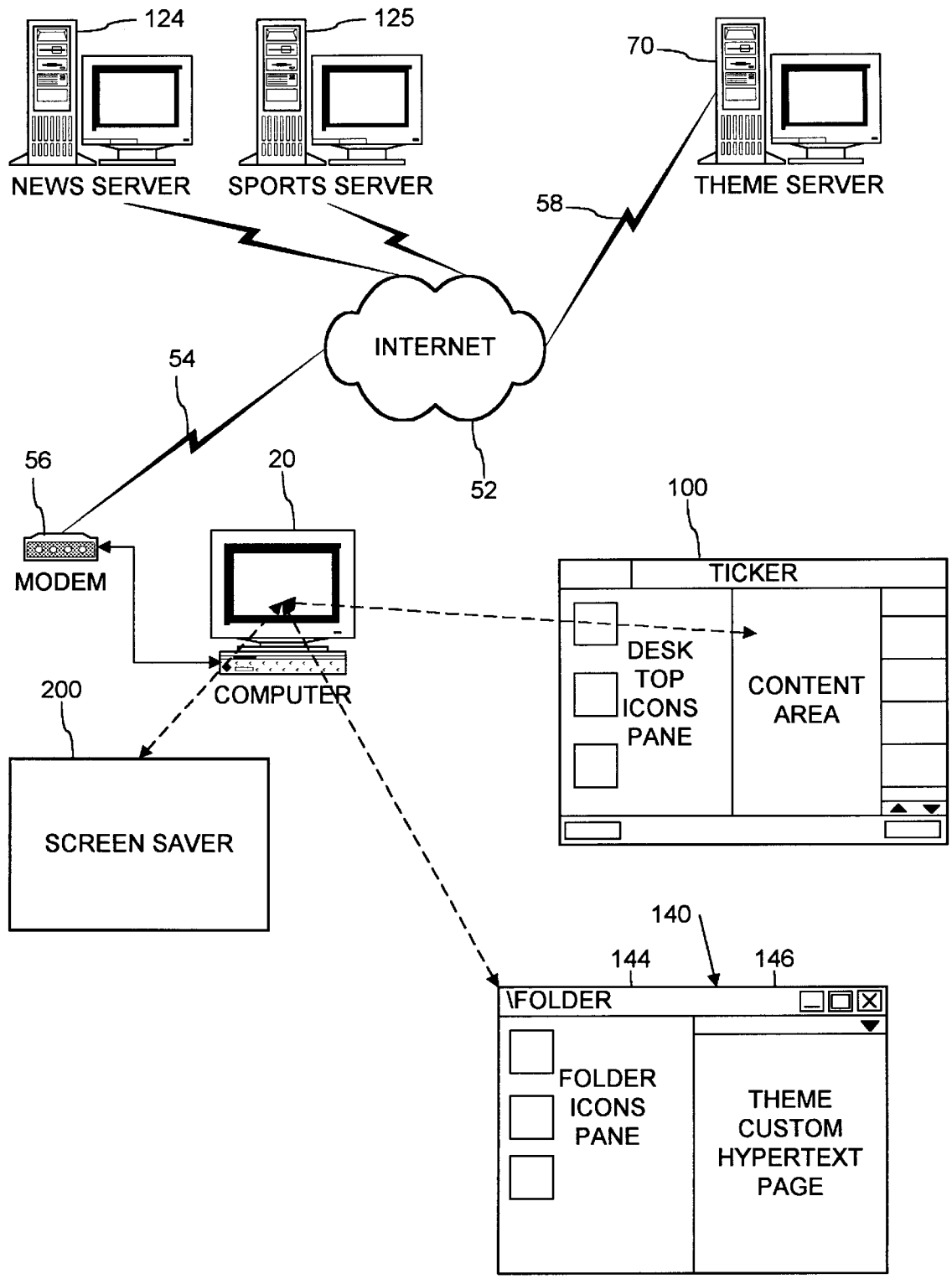
FIG. 4 is a network diagram showing themed enhancement of a graphical user interface in the computer of FIG. 1 which plays multi-media resources retrieved from remote server computers.
Figure 5:
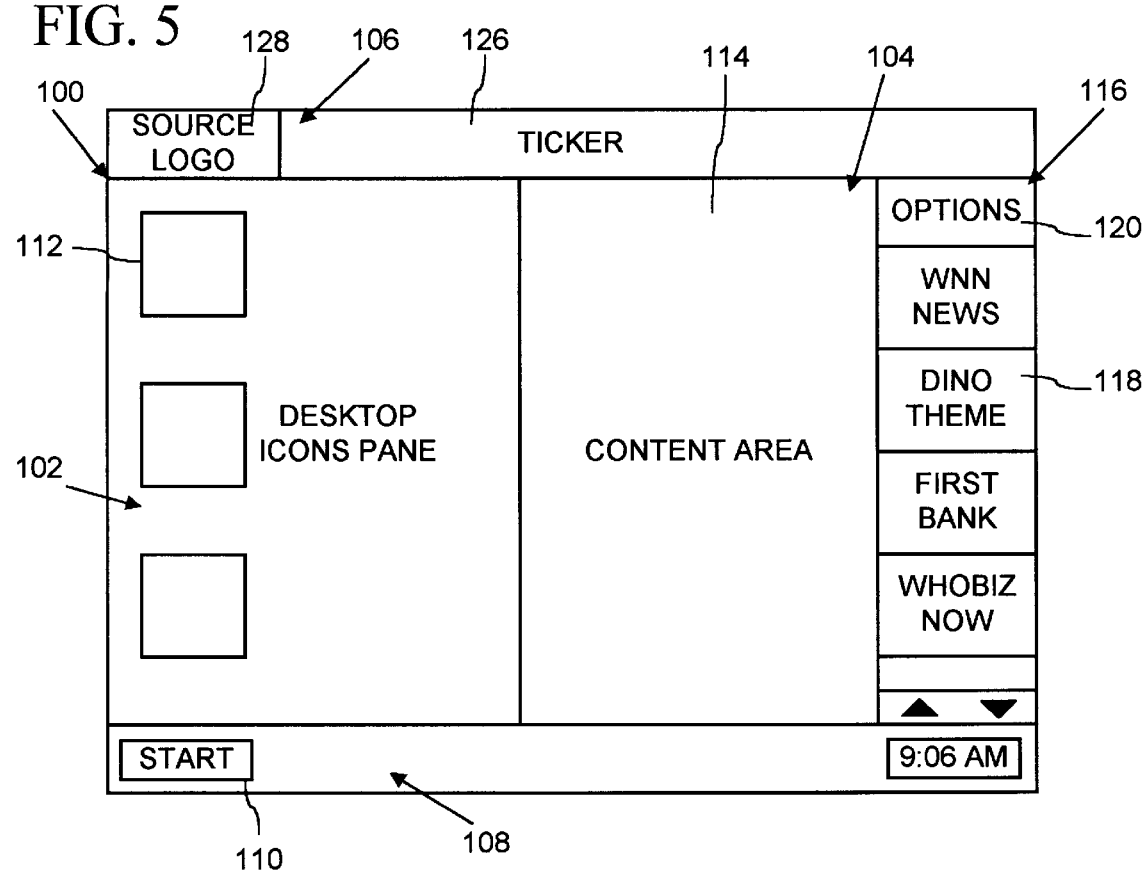
FIG. 5 is a view of a desktop display with themed enhancements presented in the graphical user interface of FIG. 4.

Referring now to FIGS. 4 and 5, themes on the computer 20 also can add a theme channel to a display 100 in the graphical user interface which plays live or locally cached information from the Internet (or other computer network such as a LAN or intranet operated in a business organization). The theme channel adds the theme server 70 as a source of the information that is played in the display 100. This allows the theme provider to integrate continually updating information that plays dynamically on a display in the graphical user interface of the computer 20.

The illustrated display 100 serves as the desktop in the graphical user interface of the computer 20 (termed the "active desktop" since live or locally cached information is continually played on the active desktop). In one embodiment of the invention, the display 100 is generated by the Web View shell component from a hypertext template, "desktop.htm." The theme can substitute a modified desktop.htm template to provide its own themed enhancements to the display 100. Although the theme can substitute a modified desktop.htm template to incorporate its own multimedia resources into the display 100, the theme preferably preserves the features of the display 100 described below. In another embodiment of the invention, a hypertext page provided by the theme is displayed in a portion of the display 100.

Referring more particularly to FIG. 5, the display 100 is divided into three panes (i.e., rectangular areas of the display), an icon or list view pane 102, an information pane 104, and a ticker pane 106. The display 100 also includes a task bar 108 with a start button 110 along a bottom edge of the display as in the Windows 95 shell.

The icon pane 102 is on a left side of the display 100, and occupies an area of approximately 70% of the display width and the full display height minus the task bar 108 and the ticker pane 106. The icon pane is a "working area" of the display 100 which operates similarly to the desktop of the Microsoft Windows 95 operating system shell. Like the Windows 95 desktop, the icon pane contains icons and shortcuts 112 for launching programs and accessing system services, and provides drag and drop, delete, rename, right click activated pop-up "context" menu functionality. Additionally, the illustrated desktop supports browser like functionality, such as single click activation and hot tracking on mouse over. This functionality is implemented by a software component (the shell listview ocx control). In some embodiments of the invention, this component is embedded into the display 100 using an object embedding HTML tag in the desktop.htx template. In others, the shell listview component can be separate from the desktop hypertext page provided by the theme.

The information pane 104 occupies an area on a right side of the display 100 which is approximately ⅓ of the width of the display and a same height as the icon pane 102. The information pane 104 has a content area 114, and a channel bar 116. In the content area 114, the computer 20 plays live or locally cached information retrieved from servers on the Internet or computer network 52. This information generally consists of HTML format data (i.e., hypertext pages) which define short teasers or news articles. The articles typically include a graphic and text caption or headline, and possibly an advertisement. Since the articles are hypertext pages in HTML format, they can include hyperlinks, embedded software components (e.g., Java applets or Visual Basic script), and other multimedia content. In general, the articles include a hyperlink to a corresponding full length news article.

Clicking on a hyperlink in the content area's articles opens the hyperlink's target in an Internet browser (e.g., the Microsoft Internet Explorer). The content area 114 shows the articles sequentially at preset intervals, in a similar fashion to an automated "slide show."

With reference to FIG. 4, the computer 20 retrieves the information that is played in the content area from servers on the Internet 52. FIG. 4. shows two representative servers, a "news" channel server 124 and a "sports" channel server 125, in addition to the theme server 70 that provide this information. The Web Check update service 84 (FIG. 3) is utilized to continually update the information played in the display 100 from these servers.

Referring again to FIG. 5, the channel bar 116 allow the user to select from a plurality of "channels" or categories of the information to play in the view port 114. Each channel is associated with one or more servers that provide the information for that channel. The illustrated channel bar 116 include buttons for a set of content providers that supply the articles played in the content area from the servers. The channel bar 116 initially includes buttons for a default set of content providers, which the user can modify by adding or deleting content provider channels as desired. The currently selected theme also can add a channel for the theme (e.g., a "Dinosaur" channel if that is the selected theme), causing the shell to place a theme channel button 118 on the channel bar. The channel bar also may include buttons for an operating system vendor's channel (e.g., "Microsoft"), and a channel for an owner of the computer network where the computer is connected in a corporate owned LAN or intranet. The user selects one of these channels by clicking on the channel's buttons. In response, the content area 114 plays information from the servers associated with the selected channel. For example, selecting the button 118 for the dinosaur theme channel causes articles downloaded from the theme server 70 to be played in the content area 114.

The channel bar 116 also includes an option button 120 which accesses a drop-down menu of viewing controls that includes "reverse," "pause," "play," and "fast forward" commands with functions similar to the like controls on a VCR for controlling the playing of information in the content area 114. The options drop down menu also includes a channel guide command for accessing a channel guide display. The channel guide display provides a user interface for the user to customize the information which is played in the content area 114.

The ticker pane 106 occupies an area running the length of the display 100 at either the top or bottom of the display 100. The ticker pane 106 has a view port 126 and a source logo 128. The view port 126 plays smaller information items, such as stock quotes, sports scores, and banner messages, in a sequential scrolling movement across the view port. These information items also are downloaded from the servers 70 and 124–125 (FIG. 4) by the Web Check update service 84 (FIG. 3). In contrast to the information pane 104, the ticker pane 106 plays information from the servers of all the channels, and not just the currently selected channel. At periodic intervals, the ticker pane 106 switches which server supplies the information items that are scrolling through the view port 126, and changes the source logo 128 to indicate the source of currently scrolling items (e.g., to a "CNN" logo to indicate the scrolling items are supplied from a server run by the Cable News Network, and to an "ESPN" logo to indicate the currently scrolling items are sourced from ESPN's server).

The information pane 104 and the ticker pane 106 are implemented as active-x controls ("infohelp.ocx" and "msticker.ocx") that are embedded in the hypertext page from which the display 100 is generated by the Web View shell component 58.

In the illustrated software architecture 30 (FIG. 3), the theme switcher application 82 (FIG. 3) adds a channel for the currently selected theme to the channel bar 116 by setting an entry in the system registry 66 as shown in the following example registry entry:

component 58 in generating a folder view display representing the folder's contents.

An illustrated folder view display 140 contains a folder content icons pane 144, and a hypertext page pane 146. The folder content icons panes 144 are on a left side of the folder view displays 140, and like the icon pane in the desktop display 100 serve as a "working area" of the display. Like folder views in the Microsoft Windows 95 shell, the folder content icons panes 144 contain icons that represent files and sub-folders in the particular file system folder being viewed, and also provides drag and drop, delete, rename, and right click context menus functionality. This functionality is implemented by a software component which, in one embodiment of the invention, is embedded into the display 100 using an object embedding HTML tag in the hypertext template associated with the folder and alternatively may be a software component separate from the hypertext page.

In one embodiment of the invention, the hypertext page pane 146 displays a hypertext page as specified in the hypertext template from which the respective folder view display 140 is generated. Depending on the particular folder view display, the hypertext page can be an operating system-provided hypertext page which is enhanced by the theme (e.g., the theme-enhanced hypertext page 146 in the folder view display 140). In which case, themed enhancements are added to the hypertext page while retaining operating system-provided multi-media elements, such as status text stating the size of the files stored in the folder or the remaining free space on a hard drive. The hypertext page pane for some of the folder views also can contain a fully theme-customized hypertext page having no operating system provided multi-media elements (e.g., the theme custom hypertext page 147).

Figure 7:
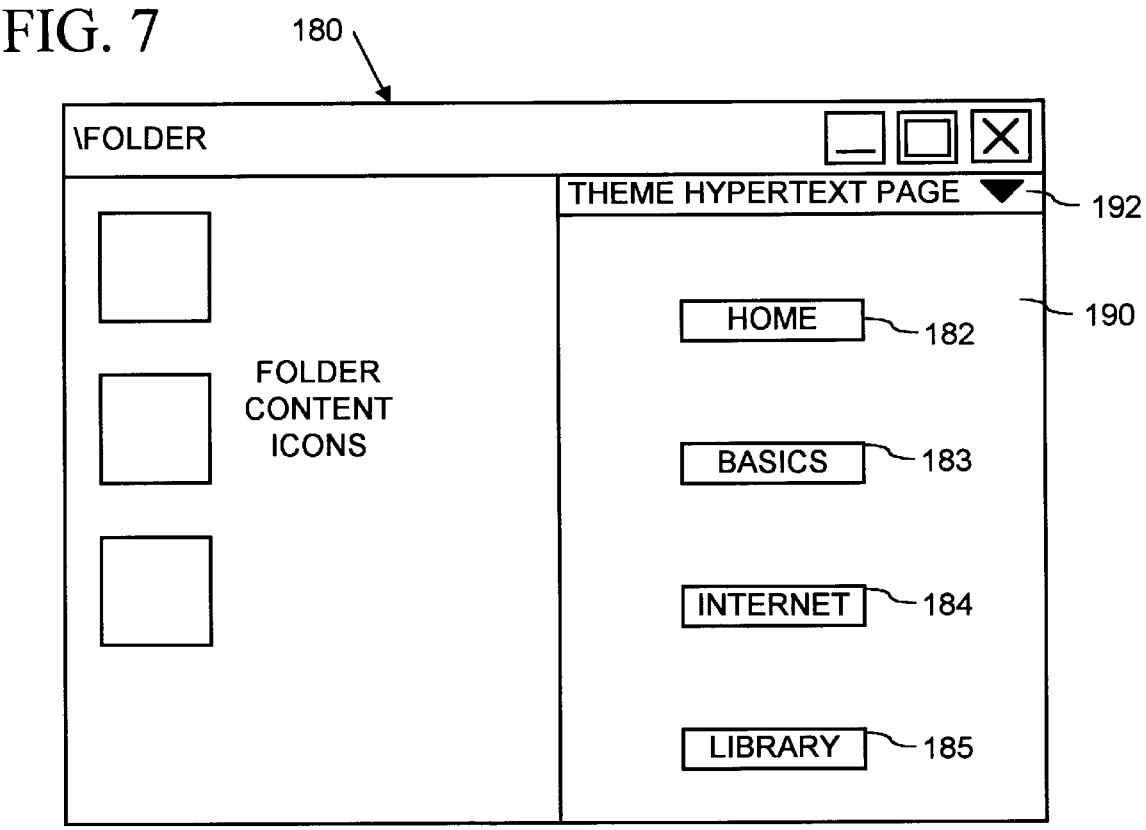
FIG. 7 is a view of a second folder display with themed enhancements presented in the graphical user interface of FIG. 4.

In some embodiments of the invention, the theme alternatively supplies a set of hypertext pages which can be viewed in a content area 190 of the hypertext page pane of a folder view display 180 (FIG. 7). These hypertext pages also are in HTML format, and can include hyperlinks, embedded software components, and other multimedia ele-

```
HKEY_CURRENT_USER\Software\Microsoft\ActiveDesktop\MicrosoftCatalog
    \Providers\SampleProvider
        Desktop URL = http://contentserver/channelcontent.htm
        Ticker URL = http://contentserver/tickerlogo.gif
        Ticker URL = http://contentserver/tickercontent.htm
```

The desktop URL value in this registry entry is a URL to a remote server (e.g., the theme server 70 of FIG. 4 or other server) from which the theme provider supplies the hypertext pages shown in the content area 114 of the information pane 104. The first ticker URL value in the registry entry is a URL that specifies an image file containing the source logo 128 of the ticker pane 106. The second ticker URL value in the registry entry is a URL to a remote server from which the theme provider supplies the hypertext pages shown in the view port 126 of the ticker pane 106.

6. Theme Enhanced and Custom Hypertext Page Displays

Figure 6:
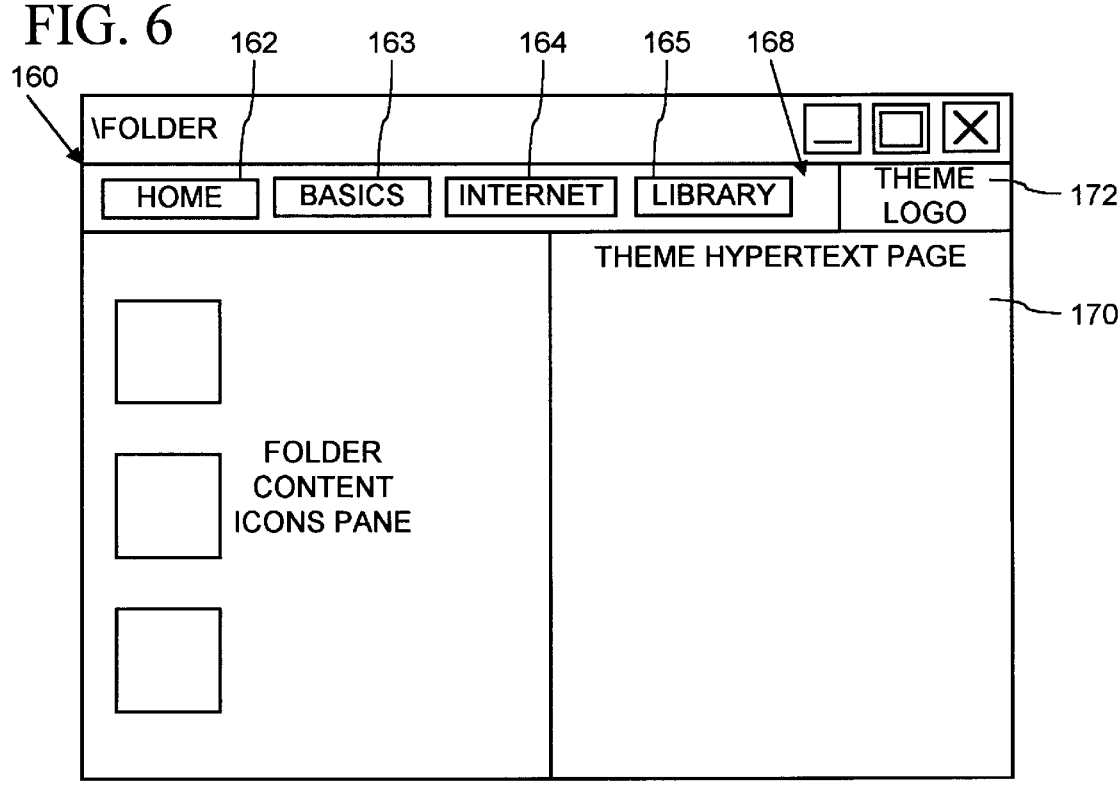
FIG. 6 is a view of a first folder display with themed enhancements including a navigation bar presented in the graphical user interface of FIG. 4.

With reference to FIGS. 4, 6 and 7, the theme 64 (FIG. 2) also can include substitute hypertext templates from which others of the graphical user interface displays 60 are generated by the Web View shell component 58 (FIG. 3). More specifically, as described in the "Operating System Shell With Hypertext Desktop" patent application, a different hypertext page (including style sheet) or template can be associated with each of the folders or folder types in the computer's file system for use by the Web View shell ments. A drop down list control 192 associated with this folder view content area provides a list of hypertext pages which are available for viewing in the content area.

The user selects one of the hypertext pages from the list control 192 to cause the selected page to be displayed in the content area 190. The set of hypertext pages available for viewing in the content area can vary between folder view displays. The theme therefore can supply different sets of hypertext pages for viewing in the folder view of different individual folders or folder types. Accordingly, the user can be provided with a different set of hypertext pages from which to select with the control 192 in the folder view of the my computer folder, than are available to select in the folder view of the control panel or other folder.

FIGS. 6 and 7 show theme-provided folder view displays 160 (FIG. 6) and 180 (FIG. 7) having hyperlinks 162–165 and 182–185 for navigation between the graphical user interface displays 60 (FIG. 3). The hyperlinks are specified in the hypertext templates provided by the theme. The hyperlinks 162–165 on the folder view display 160 of FIG.

6 are in a navigation bar pane 168, which is separate from the display's hypertext page pane 170. The illustrated navigation bar pane 168 is positioned horizontally across a top of the display 160, and also includes a theme logo 172. In the folder view display 180 of FIG. 7 on the other hand, the hyperlinks 182–185 are included on the hypertext page shown in the hypertext page pane 190.

The illustrated folder view displays 160,180 are shown with a representative set of hyperlinks that could be embedded on a hypertext page provided by a theme that is viewed on the folder view displays. This representative set of hyperlinks include a "home" hyperlink 162,182 which, when activated, opens a themes home page from the theme server 70 on the Internet with the Microsoft Internet Explorer browser software in a separate window. The representative hyperlinks on the illustrated folder view displays 160,180 also include a "basics" hyperlink, an "internet" hyperlink, and a "library" hyperlink. The basics hyperlink 163,183 jumps to a hypertext page which explains basic operating procedures of the computer 20. The internet hyperlink 164,184 jumps to a hypertext page retrieved from the Internet, which may be a default start page of an Internet browser installed on the computer or a hypertext page from the theme provider's server 70. The library hyperlink 165, 185 leads to a hypertext page which is a table of contents to a library of hypertext pages associated with the theme. These library hypertext pages may be stored at the computer 20 as part of the locally stored theme resources 64 (FIG. 2), or reside at the theme server 70 (FIG. 2). The theme can specify a text title or graphic for the hyperlinks in the hypertext templates for the displays 160,180. By default, each of the hyperlinks 163–165 and 183–185 up their target hypertext pages in a separate window of an Internet browser, such as the Microsoft Internet Explorer.

In addition to the hyperlinks 162–165 and 182–185, the user navigates between the graphical user interface displays 60 (FIG. 2) by clicking on icons in the desktop icons pane 102 of the desktop display 100 (FIG. 5), and in the folder content icons panes 144–145 of the folder view displays 140–141 (FIG. 4). For example, clicking on the My Computer icon in the desktop display 100 causes navigation to the My Computer folder view display which contains icons for each floppy and hard drive in the computer's secondary storage 42 (FIG. 1). The user then clicks on one of these drive icons to go to a folder view display of a root folder for that floppy or hard drive.

7. Hypertext Page Screen Saver

With reference again to FIG. 4, the graphical user interface displays 60 (FIG. 2) also include a screen saver display 200 which is shown by a screen saver component of the operating system shell 58 (FIG. 3) when the computer has been idle, i.e., no input from the user has been received for a preset period. The illustrated screen saver display 200 shows views of hypertext pages. Each theme that is installed at the computer 20 can provide a hypertext page for showing by the screen saver. The content providers for each of the channels on the information pane 104 of the desktop display 100 also can provide a hypertext page for the screen saver. The screen saver shows views of each of the theme-provided and channel-provided hypertext pages sequentially at intervals (similar to a slide show). The hypertext pages associated with each theme and channel content provider can be periodically updated by the Web Check update service 84 (FIG. 3) as described above. Each installed theme can include graphics, text, animations, hyperlinks, software components (Java applets and Visual Basic script) and other multimedia elements on their hypertext page for the screen saver.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A system for providing an interface having locally stored periodically updating multi-media resources for creating a user perceptible environment through which the user interacts with an operating system, the system comprising:

a local store containing locally stored multi-media resources that define elements of the user perceptible environment, a shell component of the operating system for generating the user perceptible environment using the locally stored multi-media resources;

an operating system interacting with the user through the user perceptible environment; and an updating service for automatically periodically connecting to a remote server at which update resources reside, retrieving the update resources from the remote server, and locally storing the update resources as part of the locally stored multi-media resources in the local store;

whereby the user interacts with the operating system through a dynamically changing user perceptible environment generated from the periodically updated locally stored multi-media resources.

2. The system of claim 1 wherein the locally stored multi-media resources are associated in a theme.

3. The system of claim 1 comprising:

a plurality of local stores, each containing multi-media resources associated with a different one of a plurality of themes;

a theme switcher for a user to select one of the themes, and for causing the shell to generate the user perceptible environment using the multi-media resources of the user-selected theme; and the updating service retrieving the update resources from a remote server associated with the user-selected theme, and locally storing the update resource as part of the locally stored multi-media resources associated with the user-selected theme.

4. The system of claim 1 wherein the updating service retrieves a file from the remote server, the file specifying the update resources to be locally stored by the updating service in the local store.

5. A themes application for an operating system providing an interface having locally stored periodically updating multi-media resources for creating a user perceptible environment through which the user interacts with the operating system, in which an operating system shell processes hypertext page resources into hypertext page views and shows the hypertext page views as displays in the user perceptible environment, comprising:

a plurality of groups of hypertext page resources, each group being associated with a different one of a plurality of themes; and a theme switcher for selecting one of the themes responsive to user input, and for configuring the operating system shell to process the group of hypertext page resources associated with the selected theme into the hypertext page views shown as displays in the user perceptible environment of the operating system;

wherein the user interacts with the operating system through the hypertext pages.

6. The themes application of claim 5 further comprising:

an updating service for periodically retrieving updated hypertext page resources from a remote server into the group of hypertext page resources associated with the selected theme at the computer.

7. A computer system comprising:

an operating system having an operating system shell providing an interface having locally stored periodically updating multi-media resources for creating a user perceptible environment through which the user interacts with the operating system;

an information viewing pane associated with the user perceptible environment for viewing information retrieved from a remote content provider server on a computer network;

a channel selection control responsive to user input for selecting between a plurality of categories of the information to thereby cause information of the chosen category to be shown in the information viewing pane; and a plurality of groups of multi-media resources, each group being associated with a different one of a plurality of themes; and a theme switcher responsive to user input selecting one of the themes for configuring the operating system shell to apply the group of multi-media resources associated with the selected theme to the user perceptible environment, and add the selected theme as a category selectable with the channel selection control.

8. A method of enhancing a user perceptible environment through which a user interacts with an operating system in a computer, comprising:

providing a plurality of user selectable themes;

locally storing a group of resources for each of the themes, each resource defining elements of the user perceptible environment;

configuring an operating system shell to generate the user perceptible environment of the operating system using the resources of a user-selected theme;

periodically retrieving update data from a remote server on a computer network; and updating at least the locally stored group of resources for the user-selected theme with the retrieved update data.

9. The method of claim 8 wherein the resources comprise a set of files containing data defining hypertext pages, and the step of configuring the operating system shell comprises setting configuring data to cause the operating system shell to generate graphical user interface displays in the user perceptible environment containing views of the hypertext pages.

10. The method of claim 8 wherein the user perceptible environment generated by the operating system shell includes a display with a view port for continually playing information from a remote source associated with one of a plurality of user-selectable channels, and wherein the step of configuring the operating system shell comprises:

adding a channel for the user-selected theme to the user-selectable channels such that user selection of the user-selected theme's channel causes the view port to play information from a remotes source associated with the user-selected theme.

11. A computer-readable medium having computer-executable instructions for performing the steps recited in claim 10.

12. A computer-readable medium having computer-executable instructions for performing the steps recited in claim 8.

13. A system for providing an interface having locally stored periodically updating multi-media resources for creating a user perceptible environment through which the user interacts with an operating system, the system comprising:

means for storing multi-media resources that define elements of the user perceptible environment;

means for generating the user perceptible environment using the locally stored multi-media resources;

means for interacting with the user through the user perceptible environment; and means for automatically periodically connecting to a remote server at which update resources reside, retrieving the update resources from the remote server, and locally storing the update resources as part of the locally stored multi-media resources in the local store;

whereby the user interacts with the operating system through a dynamically changing user perceptible environment generated from the periodically updated locally stored multi-media resources.

14. The system of claim 13, in which the locally stored multimedia resources are associated in a theme.

15. The system of claim 13, in which the multi-media resources comprise a set of files containing data defining hypertext pages, the system further comprising:

means for configuring an operating system shell to cause such shell to generate graphical user interface displays in the user perceptible environment containing views of the hypertext pages.

16. A computer-readable medium having computer-executable instructions for performing the elements of claim 15.

17. A computer-readable medium having computer-executable instructions for performing the elements of claim 13.

18. A themes application for an operating system providing an interface having locally stored periodically updating multi-media resources for creating a user perceptible environment through which the user interacts with the operating system, in which an operating system shell processes hypertext page resources into hypertext page views and shows the hypertext page views as displays in the user perceptible environment, comprising:

means for associating a plurality of groups of hypertext page resources with a different one of a plurality of themes;

means for selecting one of the themes responsive to user input; and means for configuring the operating system shell to process the group of hypertext page resources associated with the selected theme into the hypertext page views shown as displays in the user perceptible environment of the operating system;

wherein the user interacts with the operating system through the hypertext pages.

* * * * *